United States Patent [19]

Hara et al.

[11] Patent Number: 4,911,128
[45] Date of Patent: Mar. 27, 1990

[54] FUEL CONTROLLER FOR AN INTERNAL COMBUSTION ENGINE

[75] Inventors: Toshiro Hara; Takanori Fujimoto, both of Himeji, Japan

[73] Assignee: Mitsubishi Denki Kabushiki Kaisha, Tokyo, Japan

[21] Appl. No.: 304,627

[22] Filed: Feb. 1, 1989

[30] Foreign Application Priority Data

Feb. 1, 1988 [JP] Japan ............................ 63-22322

[51] Int. Cl.$^4$ .............................................. F02D 41/18
[52] U.S. Cl. .................................. 123/488; 123/478; 123/494
[58] Field of Search .................. 123/488, 494, 478; 73/118.2

[56] References Cited

U.S. PATENT DOCUMENTS 4,142,407  3/1979  Kuroiwa et al. .................... 73/118.2
4,721,087  1/1988  Kanno et al. ....................... 123/488

Primary Examiner—Tony M. Argenbright
Attorney, Agent, or Firm—Sughrue, Mion, Zinn, Macpeak and Seas

[57] ABSTRACT

A fuel controller for an internal combustion engine has a Karman vortex air flow sensor for sensing the air flow rate into the air intake pipe of the engine and producing an electrical output signal having a frequency which is proportional to the air flow rate. A load sensor determines the air flow rate into an air intake pipe based on the output of the air flow sensor. A determining mechanism determines whether the output of the air flow sensor is reliable. A calculator calculates the actual air intake rate into the engine according to a first formula which employs the most recent output of the load sensor when the determining mechanism determines that the output of the air flow sensor is reliable, and it calculates the actual air intake rate according to a second formula which ignores the most recent output of the air flow sensor when the determining mechanism determines that the output of the air flow sensor is not reliable.

5 Claims, 9 Drawing Sheets

FIG. 9
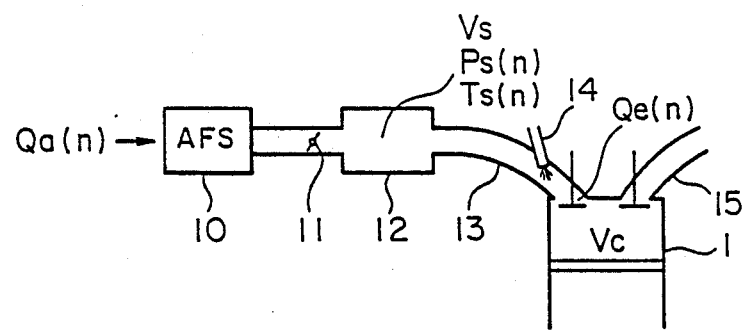
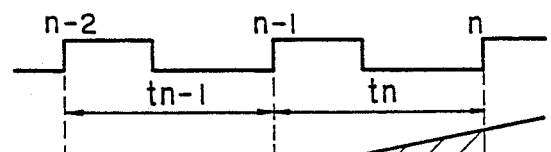
FIG. 10(a) SGT
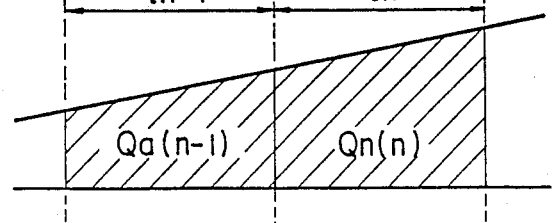
FIG. 10(b) Qa
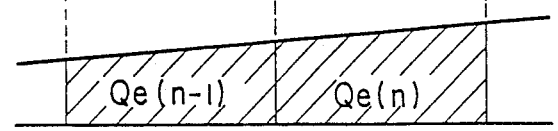
FIG. 10(c) Qe
FIG. 10(d) f FIG. 11(a) THROTTLE VALVE 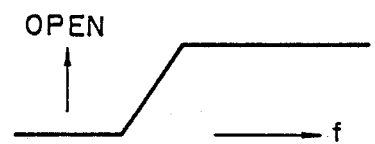
FIG. 11(b) Qa 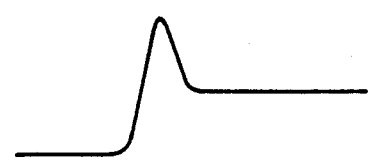
FIG. 11(c) Qe 
FIG. 11(d) P 

FUEL CONTROLLER FOR AN INTERNAL COMBUSTION ENGINE

BACKGROUND OF THE INVENTION

This invention relates to a fuel controller for an internal combustion engine which measures the rate of air intake into the engine using an air flow sensor and controls the supply of fuel to the engine based on the output of the air flow sensor. More particularly, it relates to a fuel controller which employs a Karman vortex air flow sensor.

In an internal combustion engine which employs a fuel injection system, it is conventional to dispose an air flow sensor (hereinunder abbreviated as AFS) in an air intake pipe upstream of the throttle valve of the engine and to calculate the rate of air intake per each engine revolution based on the output of the AFS. The supply of fuel to fuel injectors for the engine is then controlled based on the calculated air intake rate.

Since the AFS is disposed upstream of the throttle valve, the air flow rate measured by the AFS does not always coincide with the actual air flow rate into the engine cylinders. In particular, when the throttle valve is abruptly opened, there is a sudden increase in the air flow through the AFS, but due to the provision of a surge tank between the throttle valve and the engine cylinders, the increase in the air flow rate into the cylinders is more gradual and of a smaller magnitude than that into the AFS. Accordingly, the air flow rate measured by the AFS is greater than the actual air flow rate into the engine, and if the fuel supply were controlled based solely on the value measured by the AFS during a single brief period when the air flow rate was in transition, the air-fuel mixture would be overly rich.

Therefore, the actual air flow rate into the engine cylinders is calculated as a weighted average of the value measured by the AFS over several periods, such as during two consecutive half-revolutions of the engine, and more accurate fuel control can be performed.

In many engines, blow-by gas which leaks from the cylinders into the crank case through gaps between the pistons and the cylinders is recirculated through a gas recovery passageway back to a portion of the air intake pipe between the AFS and the throttle valve and is once again sucked into the engine.

The AFS is commonly of the Karman vortex type. When the engine is running at a low speed, such as during idling, the Karman vortices which are generated by the AFS are not very strong. In this case, the blow-by gas which is introduced into the air intake pipe can significantly disturb the vortices and make them impossible for the AFS to measure. As a result, the amount of fuel which is supplied to the engine, which is calculated on the basis of the output of the AFS, will be inaccurate and the air-fuel ratio will greatly vary. This results in problems such as rough idling.

SUMMARY OF THE INVENTION

It is therefore an object of the present invention to provide a fuel controller for an internal combustion engine which has a Karman vortex AFS and which can accurately control the supply of fuel to the engine even when the engine is running at a low speed without being adversely affected by blow-by gas.

A fuel controller according to the present invention has a Karman vortex air flow sensor which generates electrical output pulses having a frequency corresponding to the rate at which air flow into the air intake pipe of the engine. A crank angle sensor generates an electrical output pulse each time the crankshaft of the engine is at a prescribed crank angle. A load sensor generates an electrical output signal corresponding to the number of output pulses of the air flow sensor between a prescribed number of output pulses of the crank angle sensor. A determining mechanism which is responsive to the load sensor determines whether or not the output of the air flow sensor is reliable. A calculator which is responsive to the load sensor and the determining mechanism calculates the rate of air intake into the engine and generates a corresponding output signal, and a controller controls the fuel supply to fuel injectors in accordance with the output signal from the calculator. When the determining mechanism determines that the output of the air flow sensor is reliable, the calculator calculates the air intake rate using a first formula which employs the most recent output of the air flow sensor. However, when the determining mechanism determines that the output of the air flow sensor is not reliable, the calculator calculates the air intake rate using a second formula which does not employ the most recent output of the air flow sensor. Therefore, when the Karman vortices which are generated by the air flow sensor are disturbed by blow-by gas and the output of the air flow sensor is unreliable, the output of the air flow sensor is not employed in calculations and more accurate control of fuel supply is performed.

The load sensor generates an electrical output signal $AN_{(t)}$ corresponding to the number of output pulses which were generated by the air flow sensor between a prescribed number of output pulses of the crank angle sensor. The calculating means calculates the actual rate of air intake into the engine each time the load sensor generates an output signal and generates a corresponding output signal $AN_{(n)}$ having the value $AN_{(n)} = K \times AN_{(n-1)} + (1-K) \times AN_{(t)}$ when the determining means determines that the output o the air flow sensor is reliable and having the value $AN_{(n)} = AN_{(n-1)} - Y$ when the determining means determines that the output of the air flow sensor is not reliable, wherein $AN_{(n-1)}$ is the value of the output signal which was generated by the calculating means the previous time that the load sensor generated an output signal and K and Y are constants.

In a preferred embodiment, the determining mechanism determines that the output of the air flow sensor is unreliable when $AN_{(n-1)} \leq$ a first value and $[AN_{(n-1)} - AN_{(t)}] \geq$ a second value.

In a preferred embodiment, the load sensor, the determining mechanism, the calculator, and the controller are constituted by a microprocessor.

BRIEF DESCRIPTION OF THE DRAWINGS

FIG. 9 is a schematic diagram of a model of the air intake system of an internal combustion engine employing the present invention.

FIGS. 10(a–d) are a diagram of the relationship between the air intake into the AFS of FIG. 9 and the air intake into the cylinders of the engine.

FIGS. 11(a–d) are a waveform diagram showing the changes in the rate of air intake into the air intake system of FIG. 9 when the throttle valve is suddenly opened.

In the drawings, the same reference numerals indicate the same or corresponding parts.

DESCRIPTION OF THE PREFERRED EMBODIMENT

Figure 1:
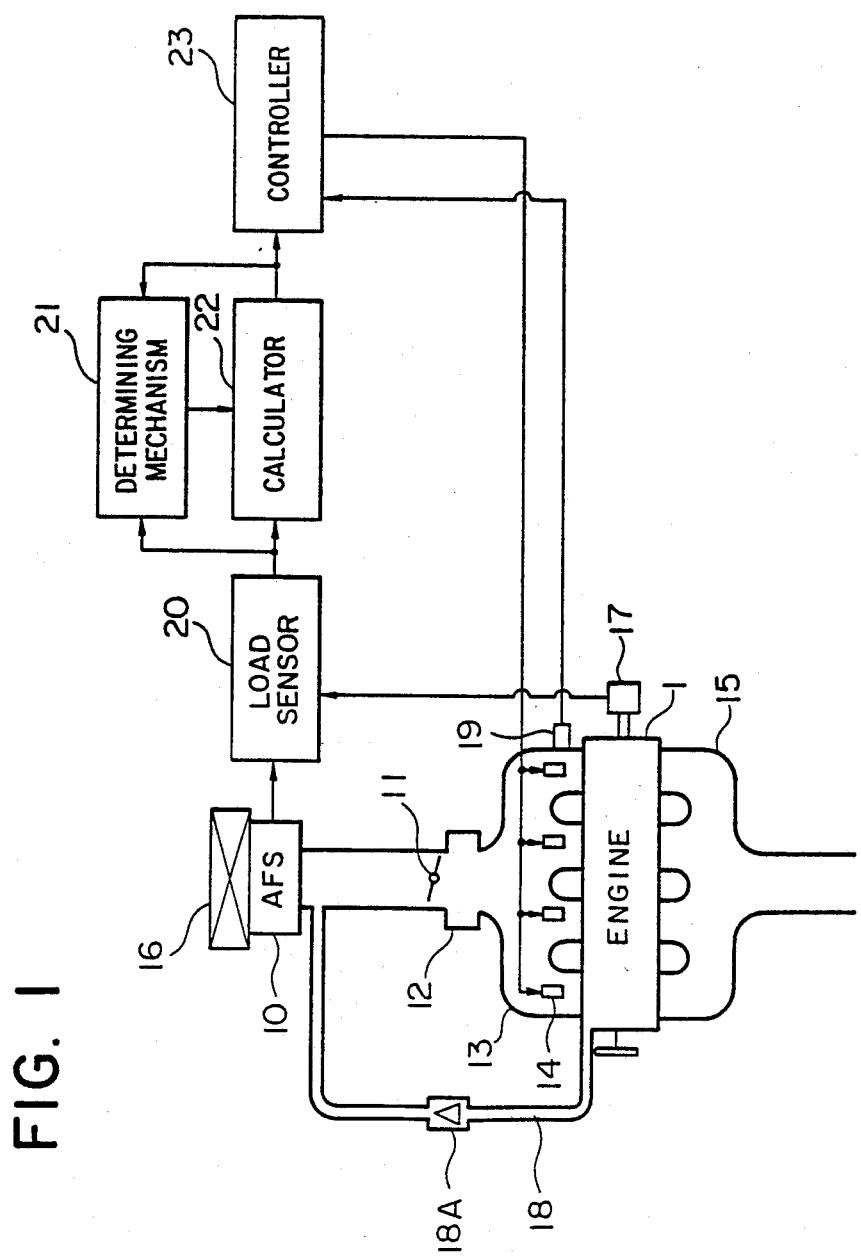
FIG. 1 is a schematic diagram conceptually illustrating the structure of a fuel controller in accordance with the present invention.

Hereinbelow, a preferred embodiment of a fuel controller in accordance with the present invention will be described while referring to the accompanying drawings. FIG. 1 is a schematic diagram which conceptually illustrates the structure of this embodiment as applied to a four-cylinder internal combustion engine 1. The engine 1 has an air intake pipe 13, at the upstream end of which is installed a Karman vortex AFS 10. The AFS 10 produces electrical output pulses having a frequency corresponding to the intake air flow rate through the AFS 10. An air cleaner 16 is disposed upstream of the AFS 10. The air intake pipe 13 is equipped with a surge tank 12, throttle valve 11 which is disposed between the AFS 10 and the surge tank 12, and four fuel injectors 14, each of which supplies fuel to one of the four cylinders of the engine 1. Combustion gas is exhausted from the engine 1 through an exhaust manifold 15. The engine 1 is further equipped with a crank angle sensor 17 which senses the angle of rotation of the crankshaft of the engine 1 and produces electrical output pulses at prescribed crank angles, such as one pulse for every 180 degrees of crankshaft rotation. A gas recovery passageway 18 for recovery of blow-by gas is connected between the engine 1 and a portion of the intake pipe 13 between the AFS 10 and the surge tank 12. It is equipped with a valve 18A for opening and closing the passageway 18. The temperature of the engine cooling water is measured by a water temperature sensor 19 which comprises a thermistor or the like and which produces an electrical output signal corresponding to the temperature.

A load sensor 20 is connected to the AFS 10 and the crank angle sensor 17. It counts the number of output pulses of the AFS 10 between consecutive pulses of the crank angle sensor 17 and produces a corresponding output signal which is input to a determining mechanism 21 and a calculator 22. The determining mechanism 21 determines whether the AFS 10 is functioning properly on the basis of the difference between two successive load signals from the load sensor 20 (the most recent signal and the previous signal). If the most recent load signal is below a first prescribed value W (which indicates that the engine is running at a low speed) and if the difference between the most recent and the previous load signals is greater than a prescribed second value X, then the determining mechanism 21 determines whether the output of the AFS 10 is reliable. The calculator 22 calculates the rate at which air enters the engine based on the output of the load sensor 20 in accordance with the output of the determining mechanism 21 and produces a corresponding output signal. It has a first and a second calculating portion, both of which are unillustrated. The first calculating portion calculates the air intake rate using a first formula when the determining mechanism 21 determines that the output of the AFS 10 is reliable, and the second calculating portion calculates the air intake rate using a second formula when the determining mechanism 21 determines that the output of the AFS 10 is not reliable. The controller 23 controls the drive time of the fuel injectors 14 based on the outputs of the calculator 22 and the water temperature sensor 19.

Figure 2:
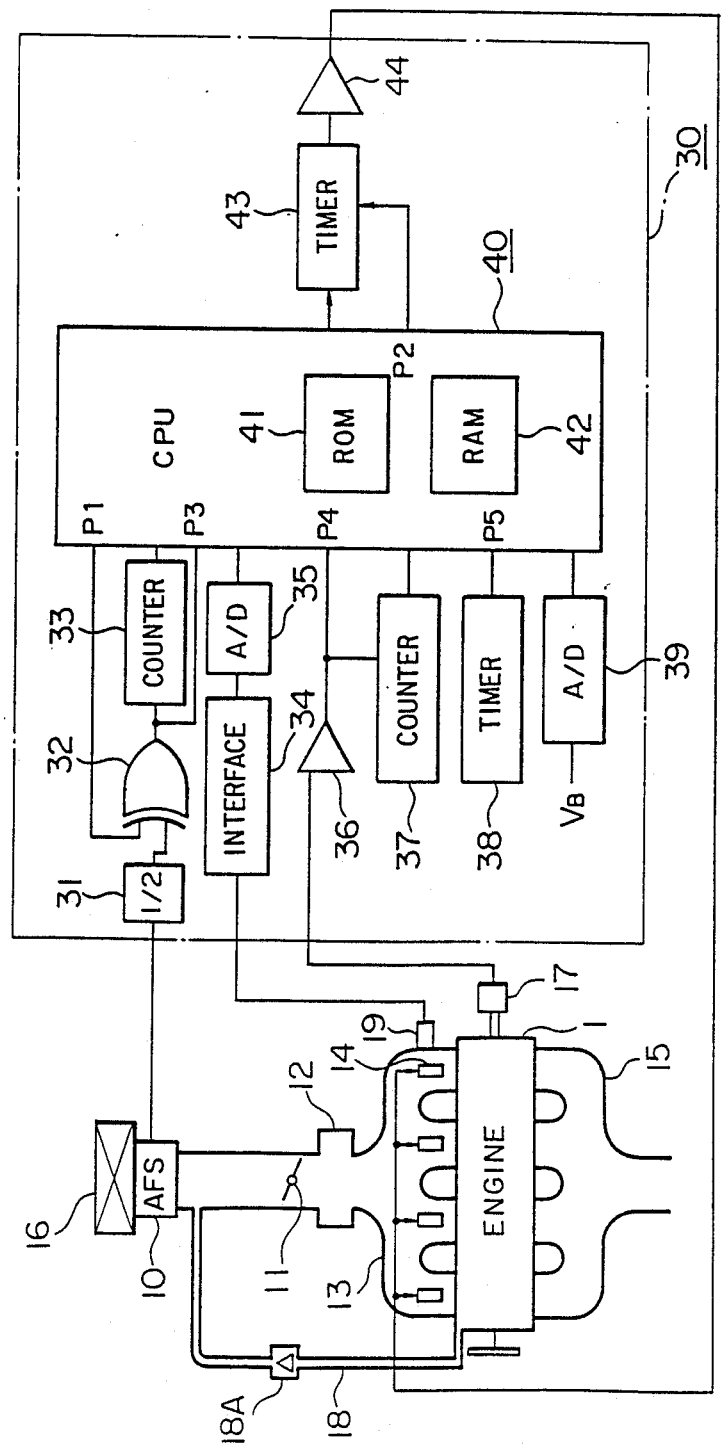
FIG. 2 is a schematic diagram illustrating the structure of the embodiment of FIG. 1 more concretely.

FIG. 2 shows the structure of this embodiment more concretely. Elements numbers 20–23 of FIG. 1 are constituted by a control unit 30 which controls the four injectors 14. The control unit 30 is controlled by a CPU 40 having a ROM 41 and a RAM 42. The output signal of the AFS 10 is input to a frequency divider 31 which produces an output signal having one-half the frequency of the AFS output signal. The output signal of the frequency divider 31 is input to one of the input terminals of an exclusive OR gate 32. The other input terminal is connected to an output port P1 of the CPU 40, whose output corresponds to the status of a frequency division flag in the RAM 42. The output terminal of the exclusive OR gate 32 is connected to a counter 33 and an interrupt input port P3 of the CPU 40. The output signal of the temperature sensor 19, which is an analog value, is input to an A/D converter 35 through an interface 34, and the digitalized value is input to the CPU 40. The output signal from the crank angle sensor 17 is input to a waveform shaper 36, and the shaped waveform is input to an interrupt input port P4 of the CPU 40 and to a counter 37. A timer 38 is connected to an interrupt input port P5 of the CPU 40. An unillustrated battery for the engine is connected to an A/D converter 39 which produces a digital output signal corresponding to the voltage $V_B$ of the battery and outputs the signal to the CPU 40. A timer 43 is set by the CPU 40 to an initial value and is triggered by an output signal from an output port P2 of the CPU 40. The output of timer 43 is input to a driver 44 which is connected to each of the four fuel injectors 14.

Next, the operation of the embodiment illustrated in FIG. 2 will be explained. The output of the AFS 10 is frequency divided by the frequency divider 31, and the output thereof, which has a frequency which is half of that of the AFS output, is input to counter 33 through the exclusive OR gate 32, which is controlled by the CPU 40. Counter 33 measures the period between the falling edges of the output of the exclusive OR gate 32. Each time there is a fall in the output of the exclusive OR gate 32, which is input to interrupt input port P3, the CPU 40 performs interrupt handling and the period of counter 33 is measured. The interrupt handling is performed once every one or two periods of the output of the AFS 10, depending on the status of output port P1 of the CPU 40, which depends on the status of the frequency division flag within the RAM 42. The output of the water temperature sensor 19 is converted into a voltage by interface 34, the output of interface 34 is changed into a digital value by A/D converter 35 at prescribed intervals, and the output of A/D converter 35 is input to the CPU 40. The output of the crank angle sensor 17 is input to interrupt input port P4 of the CPU 40 and to counter 37 through the waveform shaper 36. The CPU 40 performs an interrupt handling routine on each rising edge of the output of the crank angle sensor 17, and the period between the rising edges of the output of the crank angle sensor 17 is determined based on the output of counter 37. At prescribed intervals, timer 38 generates an interrupt request which is applied to interrupt input port P5 of the CPU 40. A/D converter 39 performs A/D conversion of the voltage $V_B$ of the unillustrated battery, and at prescribed intervals, the CPU 40 reads this battery voltage data. Timer 43 is preset by the CPU 40 and is triggered by output port P2 of the CPU 40. The timer 43 outputs pulses of a prescribed width, and this output drives the fuel injectors 14 through the driver 44.

Before describing the operation of the CPU 40, the principles underlying the calculations which are performed by the CPU 40 will be explained while referring to FIGS. 9 through 11. FIG. 9 illustrates a model of the air intake system of the internal combustion engine 1 of FIG. 1. The displacement of the engine 1 is $V_C$ per cylinder, while the volume from the throttle valve 11 to the intake valves of the engine 1 is $V_s$.

FIG. 10 illustrates the relationship between the air flow $Q_a$ into the AFS 10 and the air flow $Q_e$ into the cylinders of the engine 1. In FIG. 10, (a) illustrates the output (abbreviated as SGT) of the crank angle sensor 17 which outputs a pulse every 180 degrees of crankshaft rotation, (b) shows the air flow $Q_a$ through the AFS 10, (c) shows the air flow $Q_e$ into the cylinders of the engine, and (d) illustrates the output of the AFS 10.

The length of time between the (n−2)th rise and the (n−1)th rise of SGT is $t_{n-1}$, and the time between the (n−1)th rise and the nth rise is $t_n$. The amounts of intake air which pass through the AFS 10 during periods $t_{n-1}$ and $t_n$ are $Q_a(n-1)$ and $Q_a(n)$, respectively, and the amounts of air which enter the cylinders of the engine 1 during the same periods $t_{n-1}$ and $t_n$ are $Q_e(n-1)$ and $Q_e(n)$, respectively. Furthermore, the average pressure and the average intake air temperature in the surge tank 12 during periods $t_{n-1}$ and $t_n$ are respectively $P_s(n-1)$ and $P_s(n)$ and $T_s(n-1)$ and $T_s(n)$ $Q_a(n-1)$ corresponds to the number of output pulses from the AFS 10 in the time period $t_{n-1}$. As the rate of change of the intake air temperature is small, $T_s(n-1)$ is approximately equal to $T_s(n)$, and if the charging efficiency of the engine 1 is constant, then the following relationships hold:

$$P_{s(n-1)} \times V_c = Q_{e(n-1)} \times R \times T_{s(n)} \quad (1)$$

$$P_{s(n)} \times V_c = Q_{e(n)} \times R \times T_{s(n)} \quad (2)$$

wherein R is a constant. If the amount of air which remains in the surge tank 12 and the air intake pipe 13 during period $t_n$ is $\delta Q_{a(n)}$, then $$\begin{aligned} \delta Q_{a(n)} &= Q_{a(n)} - Q_{e(n)} \\ &= V_s \times (1/RT_s) \times (P_{s(n)} - P_{s(n-1)}) \end{aligned} \quad (3)$$

Combining Equations (1)–(3) gives the following equation:

$$\begin{aligned} Q_{e(n)} &= [1/(1 + V_c/V_s)] \times Q_{e(n-1)} + \\ &\quad [1 - 1/(1 + V_c/V_s)] \times Q_{a(n)} \end{aligned} \quad (4)$$

Accordingly, the amount of air $Q_{e(n)}$ which enters the cylinders of the engine 1 in period $t_n$ can be calculated from Equation (4) based on the amount of air $Q_{a(n)}$ which passes through the AFS 10.

If $1/(1 + V_c/V_s) = K$, then $\quad (5)$ $$Q_{e(n)} = K \times Q_{e(n-1)} + (1 - K) \times Q_{a(n)}$$

FIG. 11 illustrates the state within the air intake pipe 13 when the throttle valve 12 is suddenly opened. In FIG. 11, (a) shows the degree of opening of the throttle valve 11, and (b) shows the air flow $Q_a$ through the AFS 10. As can be seen from (b), the air flow $Q_a$ abruptly increases and overshoots a steady-state value, after which it decreases to the steady-state value. (c) shows how the air flow $Q_e$ into the cylinders of the engine increases gradually to the same steady-state value without overshooting, and (d) shows the variation in the pressure P within the surge tank 12.

Figure 3:
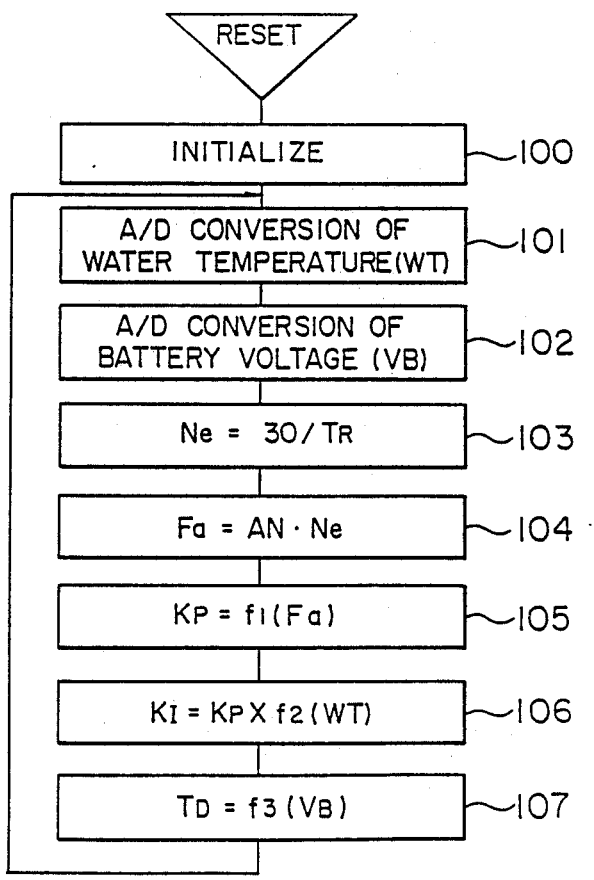
FIG. 3 is a flow chart of the main program executed by the CPU 40 of FIG. 2.
Figure 4:
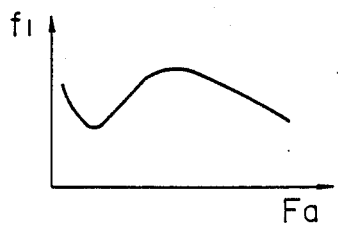
FIG. 4 is a diagram showing the relationship between the output frequency $F_a$ of the AFS of the embodiment of FIG. 2 and a function $f_1$ for determining a fundamental injection timing conversion coefficient.

Next, the operation of the CPU 40 will be explained while referring to the flow charts of FIGS. 3, 5, and 6. FIG. 3 illustrates the main program of the CPU 40. When a reset signal is input to the CPU 40, then the RAM 42, the input ports, and the like are initialized in Step 100. In Step 101, A/D conversion of the output of the water temperature sensor 19 is performed and the result is stored in the RAM 42 as WT. In Step 102, A/D conversion of the battery voltage is performed and the result is stored in the RAM 42 as VB. In Step 103, the rotational speed $N_e$ in RPM of the engine is determined by calculating the value of $30/T_R$, wherein $T_R$ is the period in seconds of the output signal from the crank angle sensor 17 and equals the time for the crankshaft to rotate 180 degrees. In Step 104, the frequency $F_a$ of the output signal of the AFS 10 is calculated by the equation $AN \times N_e/30$. AN is referred to as load data; it is equal to the number of output pulses which are generated by the AFS 10 between the rising edges of two consecutive pulses of the crank angle sensor 17 and is indicative of the engine load. In Step 105, based on the output frequency $F_a$, a basic injection timing conversion coefficient $K_p$ is calculated using a function $f_1$ which has a value with respect to $F_a$ as shown in FIG. 4. In Step 106, the basic injection timing conversion coefficient $K_p$ is corrected by a function $f_2$, which is a function of the water temperature data WT, and the corrected value is stored in the RAM 42 as injection timing conversion coefficient $K_f$. In Step 107, based on the battery voltage data VB, a data table $f_3$ which is previously stored in the ROM 41 is read, and the dead time $T_D$ (the time lag in the response of the fuel injectors 14) is calculated and stored in the RAM 42. After Step 107, the program recycles by returning to Step 101.

Figure 5:
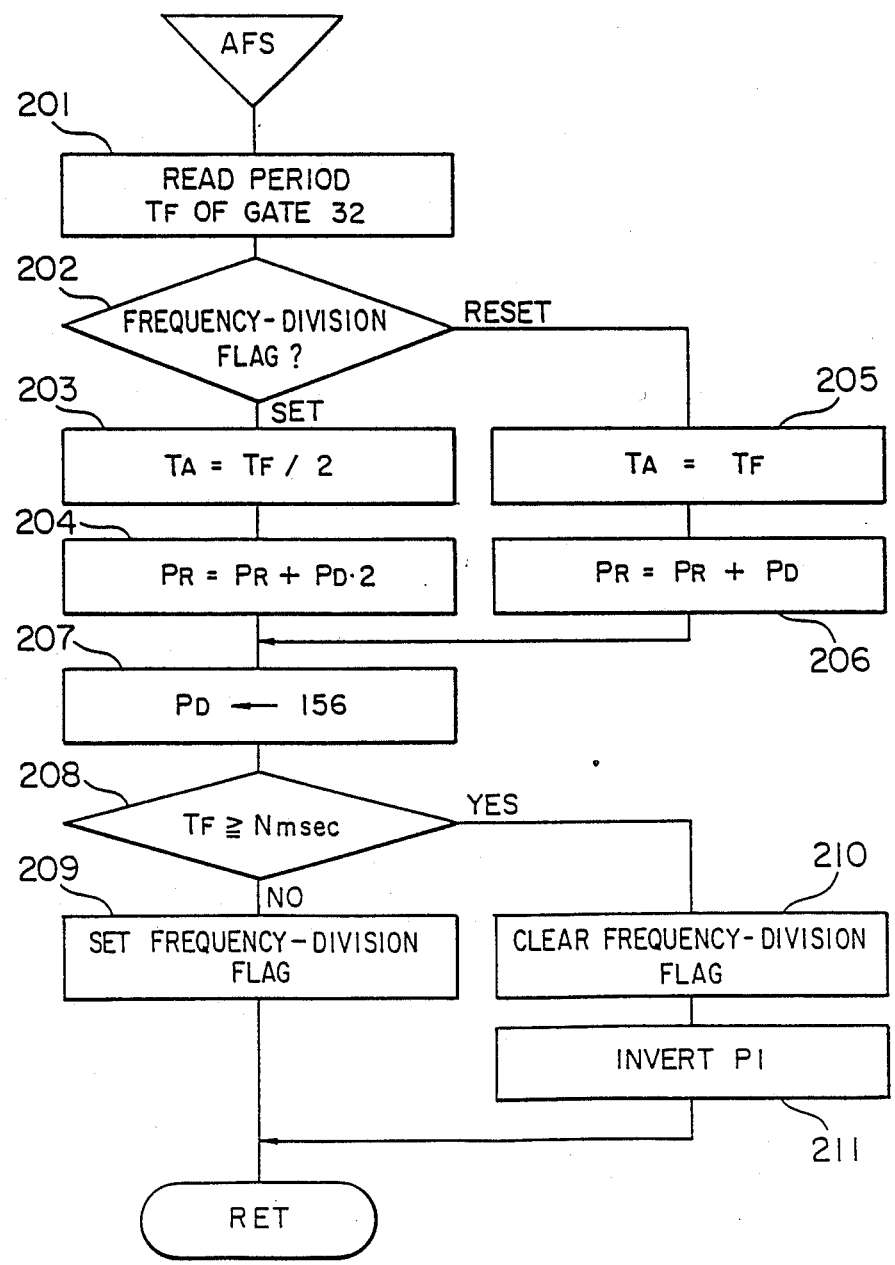
FIG. 5 and FIG. 6 are flow charts of interrupt handling routines performed by the CPU 40 of FIG. 2.

FIG. 5 illustrates an interrupt handling routine which is performed by the CPU 40 each time the output of the exclusive OR gate 32 falls. In Step 201, the output $T_F$ of counter 33 is read, and then counter 33 is cleared. $T_F$ is the period between consecutive rises in the output of the exclusive OR gate 32. In Step 202, if the frequency division flag of the RAM 42 is set, then in Step 203, $T_F$ is divided by two and is stored in the RAM 42 as the period $T_A$ of the output of the AFS 10. Next, in Step 204, two times a value referred to as the remaining pulse data $P_D$ is added to the cumulative pulse data $P_R$ to obtain a new value for the cumulative pulse data $P_R$. The cumulative pulse data $P_R$ is the total number of pulses which are output by th AFS 10 between consecutive pulses in the output of the crank angle sensor 17. For convenience of processing, $P_R$ is incremented by 156 for each pulse from the AFS 10, so that the value of $P_R$ equals 156 times the actual number of output pulses of the AFS 10. In Step 202, if the frequency division flag is reset, then in Step 205, the stored value for the output period TA of the AFS 10 is set equal to $T_F$, and in Step 206, the cumulative pulse data $P_R$ is incremented by the remaining pulse data $P_D$. In Step 207, the remaining pulse data $P_D$ is set equal to 156. In Step 208, the period $T_F$ of the exclusive OR gate 32 is compared with a prescribed value N, which is 2 msec. when the frequency division flag is reset and is 4 msec. when the frequency division flag is set. If $T_F \geq N$ msec., in Step 210, the frequency division flag is cleared, and in Step 211, output port P1 is inverted. If $T_F < N$ msec. then in Step 209, the frequency division flag is set. Thus, if Step 209 is performed, the level of output port P1 remains constant, the output of the exclusive OR gate 32 changes at the same rate as the frequency divider 31, and an interrupt request is input to interrupt input port P3 on every other output pulse of the AFS 10. In contrast, if Steps 210 and 211 are performed, the level of output port P1 is inverted after every fall in the output of the exclusive OR gate 32, the output of the exclusive OR gate 32 therefore falls every time the output of the frequency divider 31 either rises or falls, and an interrupt request is input to interrupt input port P3 upon each output pulse of the AFS 10. In other words, when Step 209 is performed, the CPU 40 receives an output from the AFS 10 which is frequency divided, and when Steps 210 and 211 are performed, it receives an output which is not frequency divided. After the processing of Step 209 or 211, interrupt handling is completed.

Figure 6:
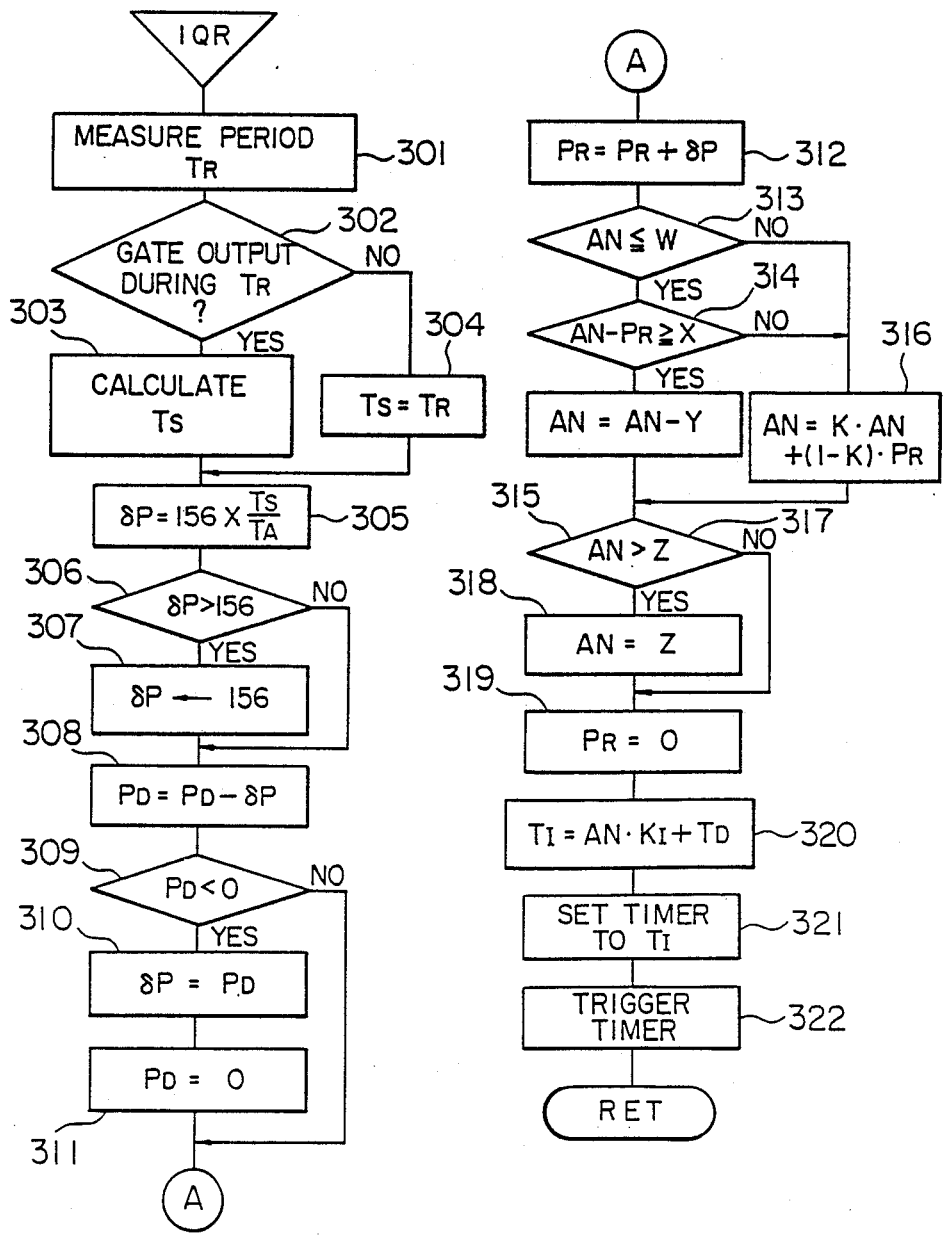
Figure 7:
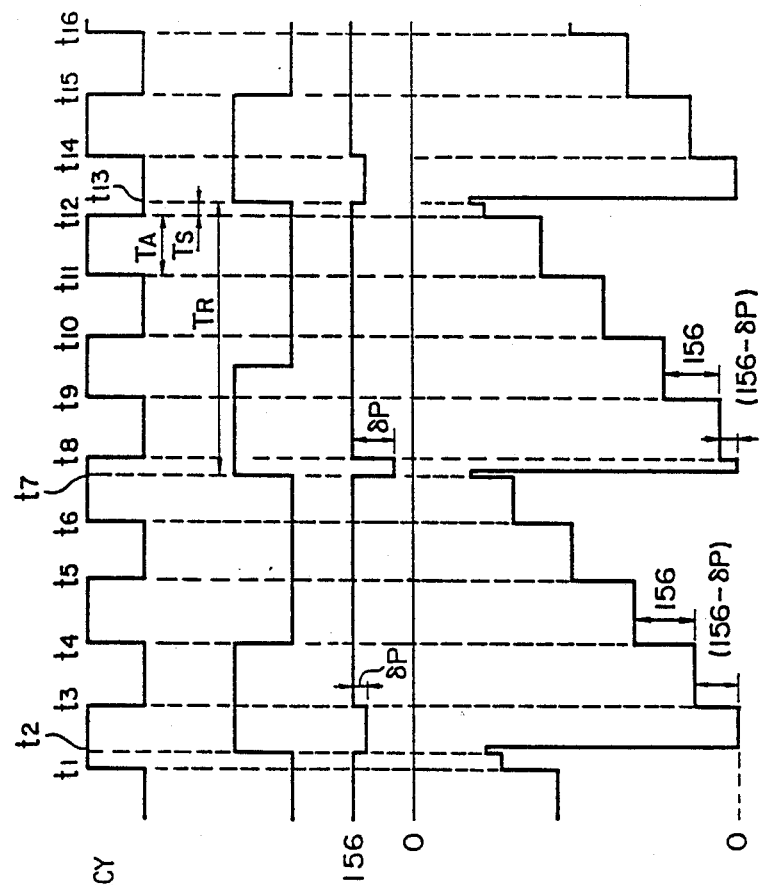
FIGS. 7(a–d) are a waveform diagram showing the values of various parameters during the operation of the embodiment of FIG. 1.

FIG. 6 is a flow chart of an interrupt handling routine which is performed when an interrupt request is input to the interrupt input port P4 of the microcomputer 40 each time the output of the crank angle sensor 17 rises. This flow chart will be explained for the case in which an interrupt request is input to interrupt input port P4 at time $t_{13}$ in FIG. 7. FIG. 7 is a waveform diagram illustrating (a) the output of the frequency divider 31, (b) the output of the crank angle sensor 17, (c) the value of the remaining pulse data $P_D$, and (d) the value of the cumulative pulse data $P_R$ when the frequency division flag in the CPU 40 is cleared. As shown in FIG. 7, the value of the remaining pulse data $P_D$ is set to 156 each time the output of the frequency divider 31 rises or falls (corresponding to each rise in the output of the AFS 10). Upon each rise in the output of the crank angle sensor 17, the value of $P_D$ is decreased by $\delta P$, which is equal to $156 \times T_S/T_A$, and the cumulative pulse data $P_R$ is increased by the value of $P_D$ at each rise or fall in the output of the frequency divider 31.

In Step 301, the period between the most recent rise (at time $t_{13}$) and the previous rise (at time $t_7$) in the output of the crank angle sensor 17 is read from counter 37 and is stored in the RAM 42 as period $T_R$. Counter 37 is then cleared. In Step 302, it is determined whether there was an output pulse from the exclusive OR gate 32 during the period $T_R$. If so, then in Step 303, the time difference $T_S$ between the time of the most recent output pulse of the exclusive OR gate 32 (at time $t_{12}$) and the time of the most recent interrupt request (time $t_{13}$) is calculated. In the case of FIG. 7, $T_S = t_{13} - t_{12}$. When there was no output pulse from the exclusive OR gate 32 during period $T_R$, then in Step 304, period $T_S$ is set equal to period $T_R$. In Step 305, the time difference $T_S$ is converted into pulse data $\delta P$ using the formula $\delta P = 156 \times T_S/T_A$. The pulse data $\delta P$ is the amount by which the cumulative pulse data $P_R$ should be increased for the length of time $T_S$. As can be seen from FIG. 7, the exact value of $\delta P$ is $156 \times T_S/(t_{14} - t_{12})$. However, as $t_{14}$ has yet to take place, it is assumed that $(t_{14} - t_{12})$ is equal to $T_A$, or in other words, it is assumed that the output of the exclusive OR gate 32 will remain substantially constant over two cycles. In Step 306, if the value of the pulse data $\delta P$ is less than or equal to 156, then the routine proceeds to Step 308, and if it is larger, then in Step 307 $\delta P$ is reduced to 156. In Step 308, the remaining pulse data $P_D$ is decreased by the pulse data $\delta P$, and the decreased value is made the new remaining pulse data $P_D$. In Step 309, if the remaining pulse data $P_D$ is positive or zero, then the routine proceeds to Step 312, and otherwise, the calculated value of the pulse data $\delta P$ is too much greater than the output pulse of the AFS 10, so in Step 310, the pulse data $\delta P$ is set equal to $P_D$, and in Step 311, the remaining pulse data $P_D$ is set equal to zero. In Step 312, the cumulative pulse data $P_R$ is increased by the pulse data $\delta P$ and a new value for the cumulative pulse data $P_R$ is obtained. $P_R$ is proportional to the number of pulses which it is thought that the AFS 10 output between consecutive rises in the output of the crank angle sensor 17, i.e., between times $t_7$ and $t_{13}$. In Step 313, it is determined whether the old value of AN $(= AN_{(n-1)})$ which was calculated up to the previous rising edge of the crank angle sensor 17 (at time $t_7$) is less than or equal to a first prescribed value W. If it is not, then in Step 316, a new value of AN $(= AN_{(n)})$ is calculated based on the old value of AN $(AN_{(n-1)})$ in accordance with Equation (5) However, in Step 313, if the old value of AN is less than or equal to W, then in Step 314, the difference between the old value of AN and the cumulative pulse data $P_R$ is compared with a second prescribed value X. If the difference is less than X, then Step 316 is performed. However, if the difference is greater than or equal to X, then it is determined that the Karman vortices of the AFS have been disturbed by blow-by gas. In this case, use of Equation (5) to calculate AN would give much too small a value, so instead, in Step 315, a new value of AN is obtained by subtracting a third prescribed value Y from the old value of AN. In Step 317, if the new value of AN is larger than a fourth prescribed value Z, then in Step 318 AN is reduced to Z so that even when the throttle of the engine 1 is fully open the value of AN will not overly exceed the actual value. In Step 319, the cumulative pulse data $P_R$ is set equal to zero. In Step 320, injection timing data $T_I$ is calculated based on the load data AN, the injection timing conversion coefficient $K_I$, and the dead time $T_D$ in the manner $T_I = (AN \times K_I) + T_D$. In Step 321, the timer 43 is set to the value of $T_I$, and in Step 322, timer 43 is triggered, causing the four fuel injectors 14 to be simultaneously driven by driver 44 in accordance with the injection timing data $T_I$. After Step 322 is performed, interrupt handling is completed, and the main program is returned to.

Figure 8:
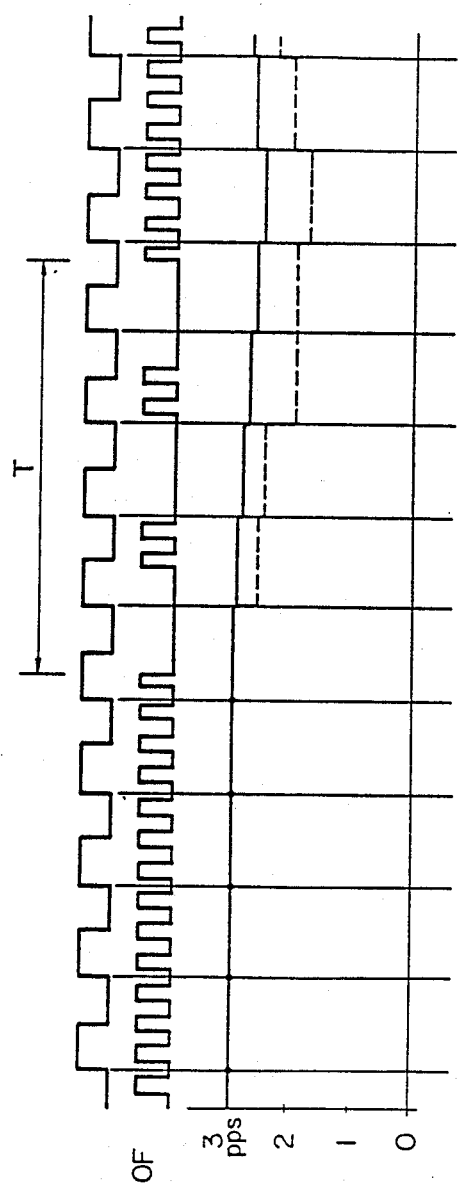
FIGS. 8(a–c) are a waveform diagram showing the outputs of the crank angle sensor 17 and the AFS of the embodiment of FIG. 1 and the calculated value of AN(n) when the AFS is disturbed by blow-by gas.

FIG. 8 is a waveform diagram which shows the changes in the calculated value of AN when the Karman vortices which are generated by the AFS 10 are disturbed by blow-by gas. In FIG. 8, (a) shows the output signal SGT of the crank angle sensor 17, (b) shows the output signal of the AFS 10, and (c) shows the calculated value of AN in pulses per stroke (pps) for the case in which the second prescribed value X of Step 314 is 0.5 pps and the third prescribed value Y of Step 315 is 0.1 pps. During the time period marked T, blow-by gas which is introduced into the air intake pipe 13 disturbs the Karman vortices which are generated by the AFS 10. As a result, some of the pulses in the output signal of the AFS 10 are missing. If this output signal were used to calculate AN by Equation (5), AN would be highly inaccurate and would vary as shown by the dashed lines in FIG. 8. However, instead of using Equation (5), during time period T, AN is calculated in the manner shown in Step 315. Therefore, it varies by a far lesser degree and corresponds much more closely to the actual air intake rate into the engine 1. Since the supply of fuel to the fuel injectors 14 is controlled in accordance with the value of AN shown by the solid lines, the fuel supply can be accurately and stably controlled at low speeds and rough idling can be prevented. Furthermore, since the supply of fuel is calculated in synchrony with the output of the crank angle sensor 17, the responsiveness of control is good.

In the above-described embodiment, the output pulses of the AFS 10 are counted between the rising edges of the output of the crank angle sensor 17, but they may be counted between falling edges. Furthermore, the number of output pulses of the AFS 10 can be counted over several periods of the output of the crank angle sensor 17 instead of over a single period. Also, although the actual number of output pulses of the AFS 10 were counted, a value which is the number of output pulses of the AFS 10 multiplied by a constant corresponding to the output frequency of the AFS 10 may be counted. In addition, the angle of the crankshaft need not be detected by a crank angle sensor 17, and the same effects can be obtained using the ignition signal for the engine.

What is claimed is:

1. A fuel controller for an internal combustion engine which is equipped with a gas recovery passageway which returns blow-by gas from the engine to an air intake pipe, said fuel controller comprising:
    a Karman vortex air flow sensor which generates electrical output pulses having a frequency corresponding to the rate at which air flows into an air intake pipe of the engine;
    crank angle sensing means for generating an electrical output pulse at one or more prescribed crank angles of the engine;
    a load sensor which generates an electrical output signal $AN_{(t)}$ corresponding to the number of output pulses which were generated by said air flow sensor between a prescribed number of output pulses of said crank angle sensing means;
    determining means responsive to said load sensor for determining if the output of said air flow sensor is reliable and generating a corresponding output signal;
    calculating means responsive to said determining means and said load sensor for calculating the actual rate of air intake into the engine each time said load sensor generates an output signal and generating a corresponding output signal $AN(n)$ having the value $AN_{(n)} = K \times AN_{(n-1)} + (1-K) \times AN_{(t)}$ when said determining means determines that the output of said air flow sensor is reliable and having the value $AN_{(n)} = AN_{(n-1)} - Y$ when said determining means determines that the output of said air flow sensor is not reliable, wherein $AN_{(n-1)}$ is the value of the output signal which was generated by the calculating means the previous time that said load sensor generated an output signal and K and Y are constants; and
    a controller for controlling the supply of fuel to fuel injectors of the engine on the basis of the output signal $AN_{(n)}$ of the calculating means.

2. A fuel controller as claimed in claim 1, wherein said load sensor comprises a pulse counter which counts the number of output pulses from said air flow sensor between a prescribed number of output pulses from said crank angle sensing means and produces a corresponding output signal.

3. A fuel controller as claimed in claim 1, wherein said determining means comprises means for determining if $AN_{(n-1)} \leq$ a first value and if $[AN_{(n-1)} - AN_{(t)}] \geq$ a second value and for generating an electrical output signal indicating that the output of the load sensor is unreliable when both of these conditions are true.

4. A fuel controller as claimed in claim 1, wherein said crank angle sensor produces an output pulse for every 180 degrees of crankshaft rotation.

5. A fuel controller as claimed in claim 1, wherein said load sensor, said determining means, said calculating means, and said controller are constituted by a microprocessor.

* * * * *